United States Patent
Kim

(10) Patent No.: US 7,207,923 B2
(45) Date of Patent: Apr. 24, 2007

(54) METHOD FOR REDUCING SHIFT SHOCK OF AUTOMATIC VEHICLE TRANSMISSION BY ENGINE TORQUE REDUCTION CONTROL

(75) Inventor: Joung Chul Kim, Suwon (KR)

(73) Assignee: Hyundai Motor Company, Seochu-Ku, Seoul (KR)

( * ) Notice: Subject to any disclaimer, the term of this patent is extended or adjusted under 35 U.S.C. 154(b) by 166 days.

(21) Appl. No.: 11/023,703

(22) Filed: Dec. 27, 2004

(65) Prior Publication Data

US 2005/0143223 A1 Jun. 30, 2005

(30) Foreign Application Priority Data

Dec. 30, 2003 (KR) .................. 10-2003-0100944

(51) Int. Cl.
- B60W 10/06 (2006.01)
- B60W 10/10 (2006.01)
- F16H 61/04 (2006.01)

(52) U.S. Cl. .................. 477/98; 477/102; 477/107; 701/54

(58) Field of Classification Search .................. None
See application file for complete search history.

(56) References Cited

U.S. PATENT DOCUMENTS

| 5,072,630 | A | * | 12/1991 | Kikuchi et al. | ............... 477/98 |
| 5,810,694 | A | * | 9/1998 | Kamada et al. | ............ 477/150 |
| 6,632,157 | B1 | * | 10/2003 | Gierling et al. | ............... 477/98 |

FOREIGN PATENT DOCUMENTS

| JP | 2003-184594 | 7/2003 |
| KR | 10-2003-0044097 | 6/2003 |

* cited by examiner

Primary Examiner—Rodney H. Bonck
Assistant Examiner—Edwin A. Young
(74) Attorney, Agent, or Firm—Morgan Lewis & Bockius LLP

(57) ABSTRACT

The method for reducing shift shock of an automatic transmission includes: detecting a current power-on upshift state; and performing a first engine torque reduction control according to an engine torque or a throttle valve opening position at an instance of a shift begin point, if the current power-on upshift state is a normal power-on upshift state. The method also includes performing a second engine torque reduction control according to an engine torque or a throttle valve opening position even after the shift begin point, if there is a power change during a power-on upshift or a current upshift is a shift during a shift.

1 Claim, 3 Drawing Sheets

METHOD FOR REDUCING SHIFT SHOCK OF AUTOMATIC VEHICLE TRANSMISSION BY ENGINE TORQUE REDUCTION CONTROL

CROSS REFERENCE TO RELATED APPLICATION

This application claims priority to Korean Application No. 10-2003-0100944, filed on Dec. 30, 2003, the disclosure of which is incorporated herein by reference.

TECHNICAL FIELD

The present invention relates to a method for reducing shift shock of an automatic vehicle transmission by an engine torque reduction control.

BACKGROUND

Generally, an engine torque reduction control is performed to reduce shift shock of an automatic transmission of a vehicle.

Conventionally, the prior engine torque reduction (ETR) control is performed simply during an upshift or a downshift. For example, during an upshift, for a simple sequential shift, the engine torque reduction control is performed for a predetermined time, if torque and throttle valve opening position at an instance of a shift begin (SB) point after a shift start (SS) point are greater than predetermined values.

Therefore, in the prior art, the engine torque reduction control is not performed during a shift such as a partial power-on lift-foot-up (LFU) shift during a kickdown shift or a kickdown shift during a lift-foot-up shift, or during a shift in which a control range is changed. In addition, in the prior art, the engine torque reduction control is not performed when a power-on upshift in which a power state is changed during a shift by an opening of a throttle valve while a lift-foot-up shift is being performed.

Furthermore, in a simple sequential shift, the engine torque reduction control is only performed depending on a torque or a throttle valve opening position at an instance of a shift begin SB point. Therefore, in the prior art, when a power-on lift-foot-up shift of a partial throttle opening occurs during a kickdown shift, or when a power-on upshift of a partial throttle opening occurs during a power off lift-foot-up shift, the engine torque reduction control is not performed, so that severe shift shocks may occur.

The information disclosed in this Background of the Invention section is only for enhancement of understanding of the background of the invention and should not be taken as an acknowledgement or any form of suggestion that this information forms the prior art that is already known to a person skilled in the art.

SUMMARY

An embodiment of the present invention provides a shift shock reducing method that is capable of reducing shift shocks even in case of a shift during a shift and changes of engine torque by an engine torque reduction control.

In a preferred embodiment of the present invention, a method for reducing shift shock of an automatic transmission, includes: detecting a current power-on upshift state; performing a first engine torque reduction control according to an engine torque or a throttle valve opening position at an instance of a shift begin point, if the current power-on upshift state is a normal power-on upshift state; and performing a second engine torque reduction control according to an engine torque or a throttle valve opening position even after the shift begin point, if there is a power change during a power-on upshift or a current upshift is a shift during a shift.

In another embodiment, the method further includes determining whether an engine temperature is greater than a predetermined temperature, wherein the performing of the first engine torque reduction control and the performing of the second engine torque reduction control according to the current power-on shift state are performed only if it is determined that the engine temperature is greater than the predetermined temperature.

In another embodiment of the present invention, the performing of the first engine torque reduction control includes: determining whether an engine torque at an instance of a shift begin point is greater than a predetermined engine torque value or a throttle opening position at the instance of the shift begin point is greater than a predetermined throttle opening position value; determining whether a current shift phase is within an inertia phase, if it is determined that the engine torque at the instance of the shift begin point is greater than the predetermined engine torque value or the throttle opening position at the instance of the shift begin point is greater than the predetermined throttle opening position value; determining whether a throttle position sensor, an engine speed sensor, a turbine speed sensor, and a CAN(Controller Area Network) communication operate normally; and performing an engine torque reduction control if it is determined that all of the throttle position sensor, the engine speed sensor, the turbine speed sensor, and the CAN communication operate normally.

In another embodiment of the present invention, the performing of the second engine torque reduction control includes: determining whether an engine torque after the shift begin point becomes greater than the predetermined engine torque value or the throttle opening position after the shift begin point becomes greater than the predetermined throttle opening position value; determining whether the current shift phase is within the inertia phase, if it is determined that the engine torque after the shift begin point becomes greater than the predetermined engine torque value or the throttle opening position after the shift begin point becomes greater than the predetermined throttle opening position value; determining whether a throttle position sensor, an engine speed sensor, a turbine speed sensor, and a CAN(Controller Area Network) communication operate normally; and performing an engine torque reduction control if it is determined that all of the throttle position sensor, the engine speed sensor, the turbine speed sensor, and the CAN communication operate normally.

In still another embodiment of the present invention, a method for reducing shift shock of an automatic transmission includes: determining whether a power-on upshift condition exists; performing a first engine torque reduction control based on an engine torque and a throttle opening position at an instance of a shift begin point, if the power-on upshift condition exists; determining whether there is a power change and a condition for a new shift exists after the shift begin point during the power-on upshift; and performing a second engine torque reduction control based on an engine torque and a throttle opening position, if it is determined that there is a power change and the condition for the new shift exists after the shift begin point during the power-on upshift.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE EMBODIMENTS

Hereinafter, a preferred embodiment of the present invention will be described in detail with reference to the accompanying drawings.

An embodiment of the present invention relates to a method for reducing shift shock of an automatic transmission by an engine torque reduction control, and more particularly, to a method for reducing shift shock by performing an engine torque reduction control when a shift is performed during a shift or when an engine torque changes during a shift.

In an embodiment of the present invention, an engine torque reduction control is performed when a power state changes during an upshift, and an engine torque reduction control is performed even after a shift begin (SB) point, if an engine torque or a throttle opening position becomes greater than predetermined values, so that a shift shock that is caused by a change of a power state can be reduced. For example, when a power-on upshift of a partial throttle opening occurs during a power off lift-foot-up shift, the engine torque reduction control is performed.

Figure 3:
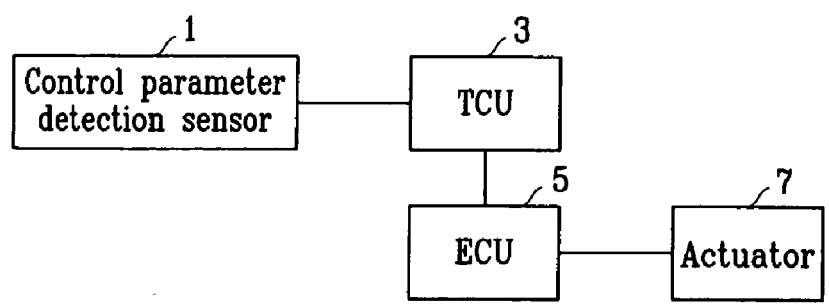
FIG. 3 is a block diagram of a system for realizing a control method according to an embodiment of the present invention.

A system for realizing such a control method according to an embodiment of the present invention may include, as shown in FIG. 3, control parameter detection sensors 1 for detecting at least one control parameter, a transmission control unit (TCU) 3 connected to the control parameter detection sensors 1 to receive signals therefrom, an engine control unit (ECU) 5, and an actuator 7 for realizing an engine torque reduction under the control of the ECU 5.

The control parameter detection sensors 1 may include an engine temperature sensor for detecting an engine temperature, a throttle position sensor for detecting a throttle position, an engine speed sensor for detecting an engine speed (rpm), and a turbine speed sensor for detecting a turbine speed (rpm).

The TCU 3 determines whether an engine torque reduction control is needed to reduce a shift shock, on the basis of the sensor signals input from the control parameter detection sensor 1, and outputs a corresponding control signal to the ECU 5 where the engine torque reduction control is needed. The ECU 5 generates a control signal for controlling the actuator 7 to perform a corresponding engine torque reduction control.

Figure 1:
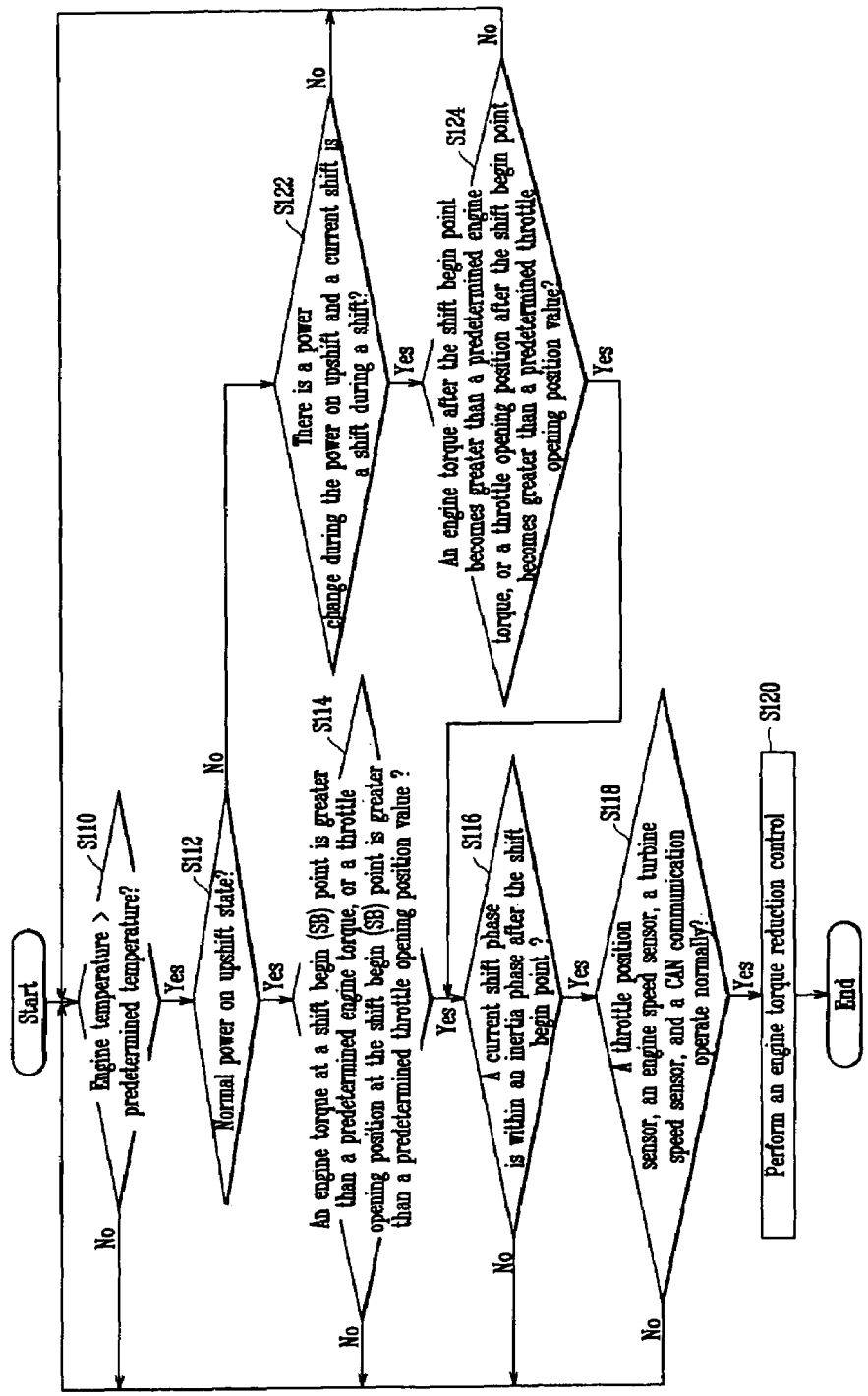
FIG. 1 is a method for reducing shift shock of a vehicle automatic transmission by an engine torque reduction control according to an embodiment of the present invention.
Figure 2:
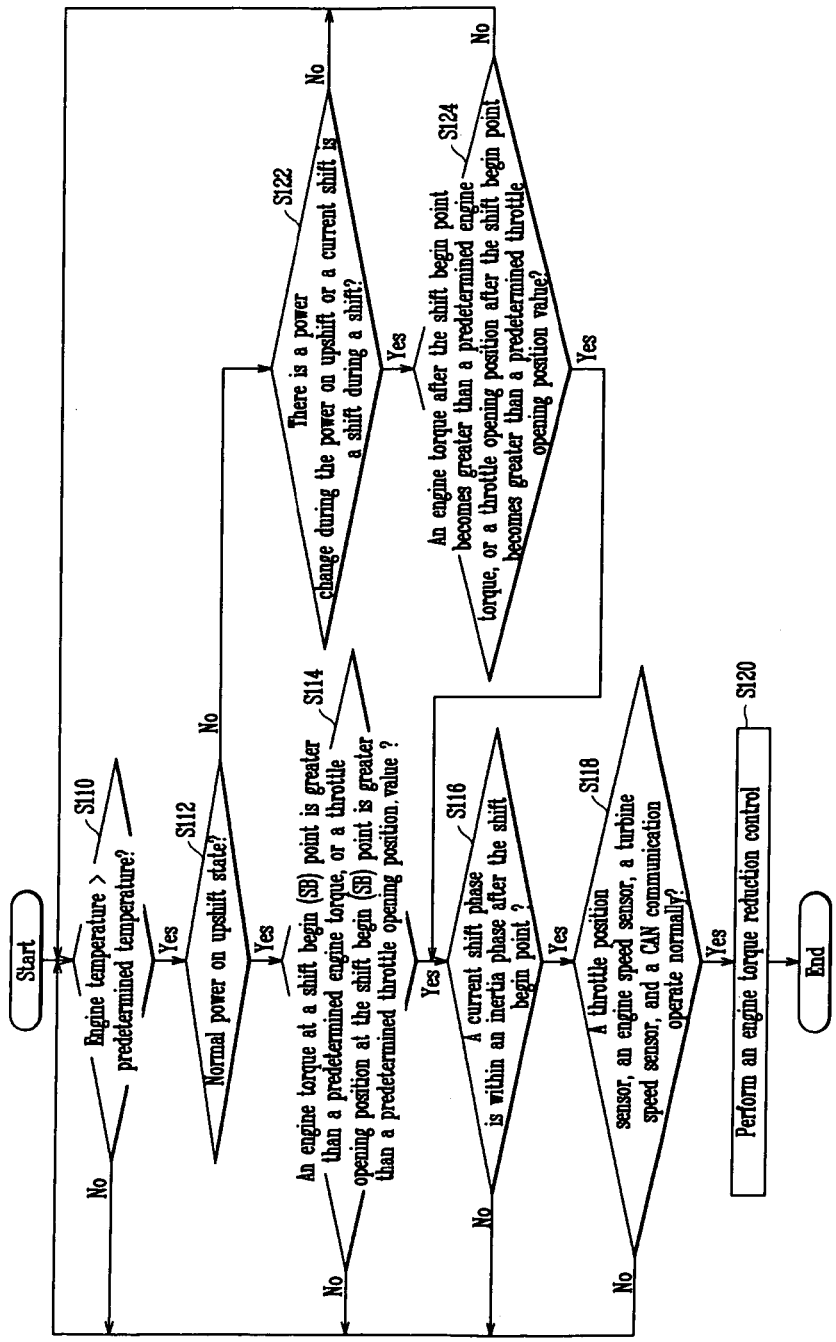
FIG. 2 is a method for reducing shift shock of a vehicle automatic transmission by an engine torque reduction control according to another embodiment of the present invention.

FIGS. 1 and 2 are flow charts showing a method for reducing shift shock of an automatic vehicle transmission by an engine torque reduction control according to an embodiment of the present invention. At first, at step S110 of FIGS. 1 and 2, a transmission control unit (not shown) detects an engine temperature by analyzing a signal input from an engine temperature sensor, and compares the detected engine temperature with a predetermined temperature. The predetermined temperature may be stored in a separate memory such as a ROM, or a RAM. For example, it is preferable that the predetermined temperature may be set to 50° C. In addition, data and programs for performing the engine torque reduction control may be stored in the memory.

If it is determined that the engine temperature is greater than the predetermined temperature, at step S110, the transmission control unit performs corresponding shift control operations according to a power-on upshift state. At step S112, it is determined whether a current power-on upshift state is a normal power-on upshift state.

For example, if the power-on upshift state is the normal power-on upshift state, the transmission control unit determines whether an engine torque at an instance of a shift begin (SB) point is greater than a predetermined engine torque value, or whether a throttle opening position at an instance of the shift begin (SB) point is greater than a predetermined throttle opening position value, at step S114. The SB point indicates a point at which a hydraulic pressure begins being released from an off-going friction element and a hydraulic pressure begins being supplied to an on-coming friction element. The normal power-on upshift state means a state in which there is no power change during a shift and a current shift is not a shift during a shift.

If it is determined that the engine torque at the instance of the shift begin (SB) point is greater than the predetermined engine torque value, or that the throttle opening position at the instance of the shift begin (SB) point is greater than a predetermined throttle opening position value, the transmission control unit determines whether a current shift phase is within an inertia phase after the shift begin (SB) point, at step S116. The inertial phase means an actual shifting period between the SB point and a point at which the off-going friction element is fully disengaged and the on-coming friction element is fully engaged.

If it is determined that the current shift phase is within the inertia phase after the shift begin (SB) point, the transmission control unit determines, at step S118, whether a throttle position sensor, an engine speed sensor, a turbine speed sensor, and a CAN (controller area network) communication operate normally.

If it is determined, at step S118, that all of the throttle position sensor, the engine speed sensor, the turbine speed sensor, and the CAN communication operate normally, the transmission control unit performs the engine torque reduction control at step S120. At this time, the engine torque reduction control is performed for a required time and by a required degree. The required time and the required degree of the engine torque reduction control are known to a person ordinarily skilled in the art, so detailed explanations for the same will be omitted.

On the other hand, if it is determined that the current power-on upshift state is not the normal power-on upshift state, at step S112, the transmission control unit determines whether there is a power change during the power-on upshift and a current shift is a shift during a shift, at step S122 of FIG. 1, or whether there is a power change during the power-un upshift or a current shift is a shift during a shift, at step S122 of FIG. 2. If it is determined, at step S122, that there is a power change during the power-on upshift and/or the current shift is a shift during a shift, the transmission control unit determines whether an engine torque during a period after the shift begin (SB) point becomes greater than a predetermined engine torque value, or whether a throttle opening position after the shift begin (SB) point becomes greater than a predetermined throttle opening position value, at step S124. occurs and by the torque change during a shift can be substantially reduced.

If it is determined that the engine torque after the shift begin (SB) point becomes greater than the predetermined engine torque value, or that the throttle opening position after the shift begin (SB) point becomes greater than the predetermined throttle opening position value, a control procedure advances to step S116 where the transmission control unit determines whether a current shift phase is within an inertia phase after the shift begin (SB) point.

According to an embodiment of the present invention, by performing the engine torque reduction control in a shift during a shift as well as in a normal sequential shift, e.g., by performing the engine torque reduction control when the power-on lift-foot-up shift of the partial throttle opening position occurs during the kickdown shift or when the kickdown shift occurs during the lift-foot-up shift, a shift shock caused by an overlap of hydraulic pressure when a shift during a shift occurs and by the torque change during a shift can be substantially reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for reducing shift shock of an automatic transmission, comprising:

detecting a current power-on upshift state;

determining whether an engine temperature is greater than a predetermined temperature;

only if it is determined that the engine temperature is greater than the predetermined temperature, performing a first engine torque reduction control according to an engine torque or a throttle valve opening position at an instance of a shift begin point, if the current power-on upshift state is a normal power-on upshift state; and only if it is determined that the engine temperature is greater than the predetermined temperature, performing a second engine torque reduction control according to an engine torque or a throttle valve opening position even after the shift begin point, if there is a power change during a power-on upshift or a current upshift is a shift during a shift;

wherein the performing the first engine torque reduction control comprises:

determining whether an engine torque at an instance of the shift begin point is greater than a predetermined engine torque value or a throttle opening position at the instance of the shift begin point is greater than a predetermined throttle opening position value;

determining whether a current shift phase is within an inertia phase, if it is determined that the engine torque at the instance of the shift begin point is greater than the predetermined engine torque value or the throttle opening position at the instance of the shift begin point is greater than the predetermined throttle opening position value;

determining whether a throttle position sensor, an engine speed sensor, a turbine speed sensor, and a CAN(Controller Area Network) communication operate normally; and performing an engine torque reduction control if it is determined that all of the throttle position sensor, the engine speed sensor, the turbine speed sensor, and the CAN communication operate normally;

and wherein the performing of the second engine torque reduction control comprises:

determining whether an engine torque after the shift begin point becomes greater than the predetermined engine torque value or the throttle opening position after the shift begin point becomes greater than the predetermined throttle opening position value;

determining whether the current shift phase is within the inertia phase, if it is determined that the engine torque after the shift begin point becomes greater than the predetermined engine torque value or the throttle opening position after the shift begin point becomes greater than the predetermined throttle opening position value;

determining whether a throttle position sensor, an engine speed sensor, a turbine speed sensor, and a CAN(Controller Area Network) communication operate normally; and performing an engine torque reduction control if it is determined that all of the throttle position sensor, the engine speed sensor, the turbine speed sensor, and the CAN communication operate normally.

* * * * *